United States Patent
Hoyle et al.

(10) Patent No.: US 10,370,097 B2
(45) Date of Patent: *Aug. 6, 2019

(54) ANTI-DRIVE MECHANISM FOR RISE AND FALL ROTATING CONTROL SYSTEMS

(71) Applicant: BELL HELICOPTER TEXTRON INC., Fort Worth, TX (US)

(72) Inventors: Jason L. Hoyle, Mansfield, TX (US); Frank B. Stamps, Colleyville, TX (US)

(73) Assignee: Bell Helicopter Textron Inc., Forth Worth, TX (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/709,203

(22) Filed: Sep. 19, 2017

(65) Prior Publication Data

US 2018/0029700 A1 Feb. 1, 2018

Related U.S. Application Data

(63) Continuation of application No. 14/510,813, filed on Oct. 9, 2014, now Pat. No. 9,764,832.

(51) Int. Cl.
*B64C 27/32* (2006.01)
*B64C 27/605* (2006.01)

(52) U.S. Cl.
CPC ............ *B64C 27/605* (2013.01); *B64C 27/32* (2013.01)

(58) Field of Classification Search
CPC .............................. B64C 27/32; B64C 27/605
See application file for complete search history.

(56) References Cited

U.S. PATENT DOCUMENTS

| 2,689,616 | A | * | 9/1954 | Nagler | B64C 27/605 188/313 |
| 3,097,701 | A | * | 7/1963 | Buivid | B64C 27/50 416/143 |
| 4,688,993 | A | * | 8/1987 | Ferris | B64C 27/605 416/114 |
| 6,231,005 | B1 | * | 5/2001 | Costes | B64C 27/605 244/17.25 |
| 6,616,095 | B2 | * | 9/2003 | Stamps | B64C 27/08 244/17.13 |
| 7,988,089 | B2 | * | 8/2011 | Wittmer | B64C 27/68 244/17.13 |

OTHER PUBLICATIONS

Office Action dated Jan. 19, 2017 from parent U.S. Appl. No. 14/510,813 10 Pages.
Notice of Allowance dated May 23, 2017 from parent U.S. Appl. No. 14/510,813 5 Pages.

* cited by examiner

*Primary Examiner* — Woody A Lee, Jr.
(74) *Attorney, Agent, or Firm* — James E. Walton

(57) ABSTRACT

A rotor blade system includes a hub assembly pivotally attached to a rotor blade, a mast attached to the hub assembly, and a swashplate engaged with the mast, the swashplate includes a non-rotating ring and a rotating ring. The method to raise the swashplate includes using an anti-drive link system pivotally engaged with a transmission top case and pivotally engaged with the non-rotating ring.

10 Claims, 6 Drawing Sheets

ANTI-DRIVE MECHANISM FOR RISE AND FALL ROTATING CONTROL SYSTEMS

BACKGROUND

1. Field of the Invention

The present application relates generally to rotor systems, and more specifically, to a rotor system blade having an anti-drive system for raising and lowering the swashplate of the rotor system.

2. Description of Related Art

Rotor systems for helicopters are well known in the art and are necessary systems to create flight. The rotor system includes a swashplate configured to rotate and traverse along the mast of the rotor system. An anti-drive system is generally operably associated with the swashplate and configured to raise and lower the swashplate along the mast. As depicted in FIG. 1, a conventional rotor systems 100 includes a rotor hub assembly 102 configured to pivotally attach to and rotate one or more blades 104 during flight. The root section 106 of blade 104 attaches to a rotating ring 108 of swashplate 110 via a link 112. A non-rotating ring 114 of swashplate 114 is engaged with the top case 116 of a transmission via a link mechanism 118. During use, the swashplate 110 is elevated and lower along mast 118 via the link mechanism 118.

Although effective in traversing the swashplate along the mast in the collective stroke direction, as depicted with arrow D1, along the mast 118, it should be understood that the link mechanism does not efficiently perform in all scenarios. Thus, the foregoing developments in the field of rotor systems represent great strides, however many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
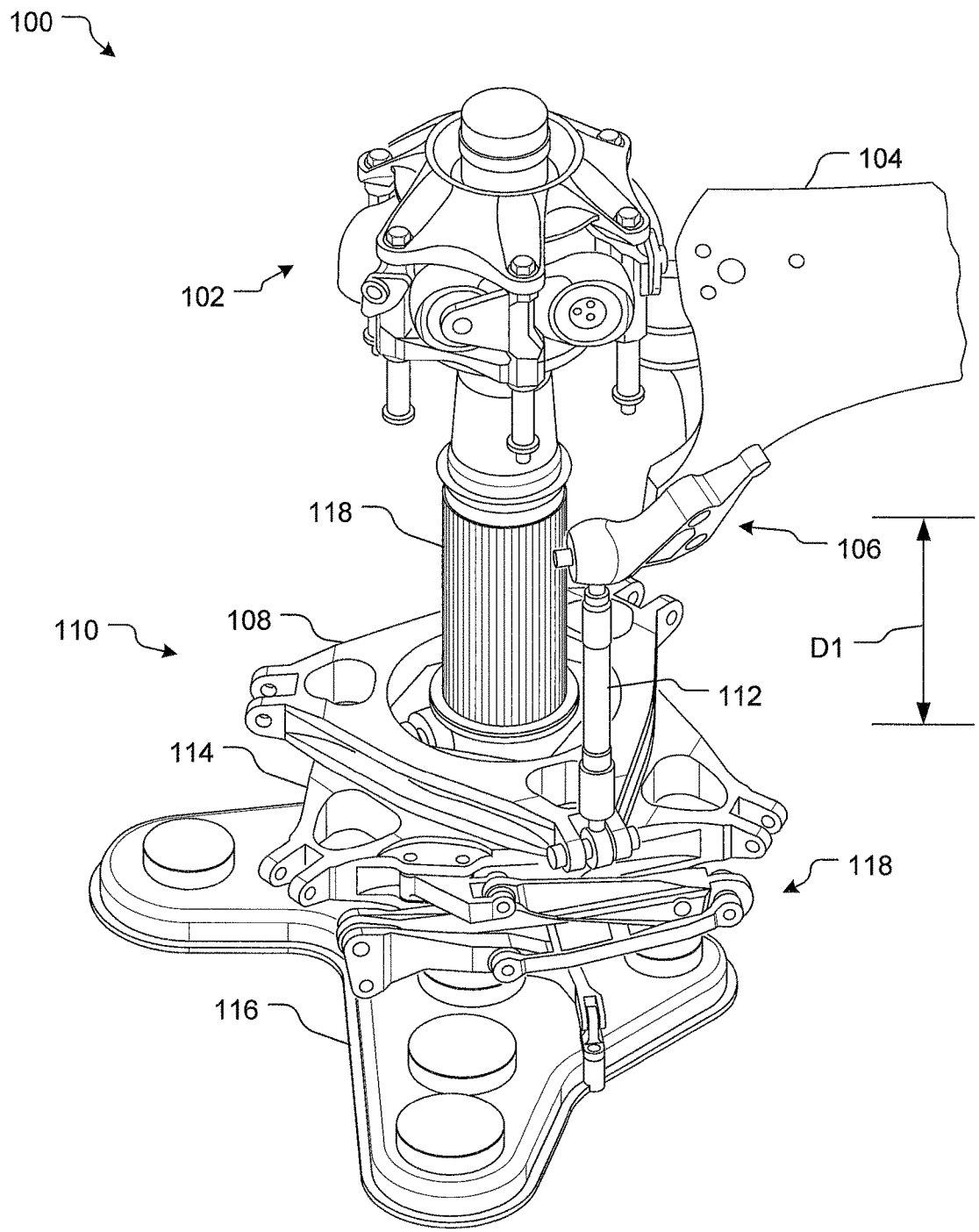
FIG. 1 is an oblique view of a conventional rotor system.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional rotor systems. Specifically, the system of the present application includes an anti-drive system pivotally mounted to the side opposing the drive point of the non-rotating swashplate ring and configured to provide sufficient space to allow full extension of the collective stroke of the swashplate along the mast. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
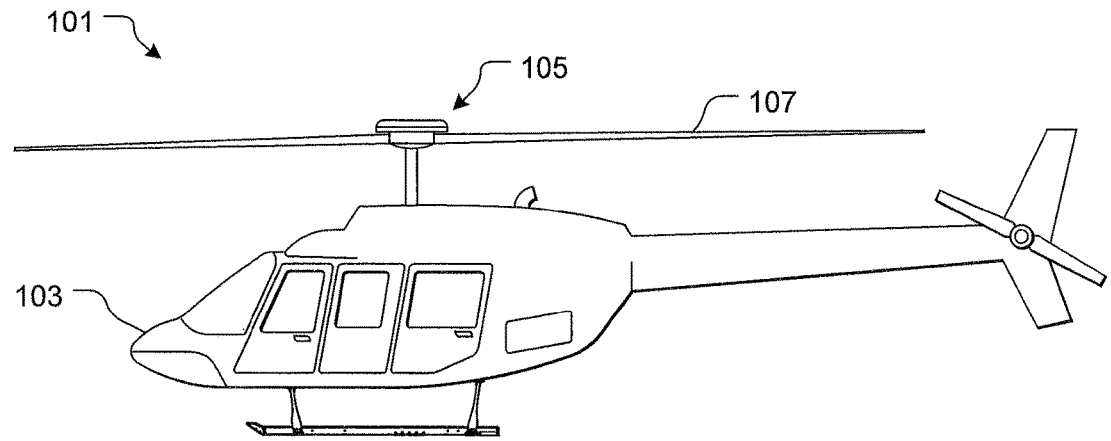
FIG. 2 is a side view of a helicopter according to a preferred embodiment of the present application.

Referring now to the drawings wherein like reference characters identify corresponding or similar elements throughout the several views, FIG. 2 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

Figure 3:
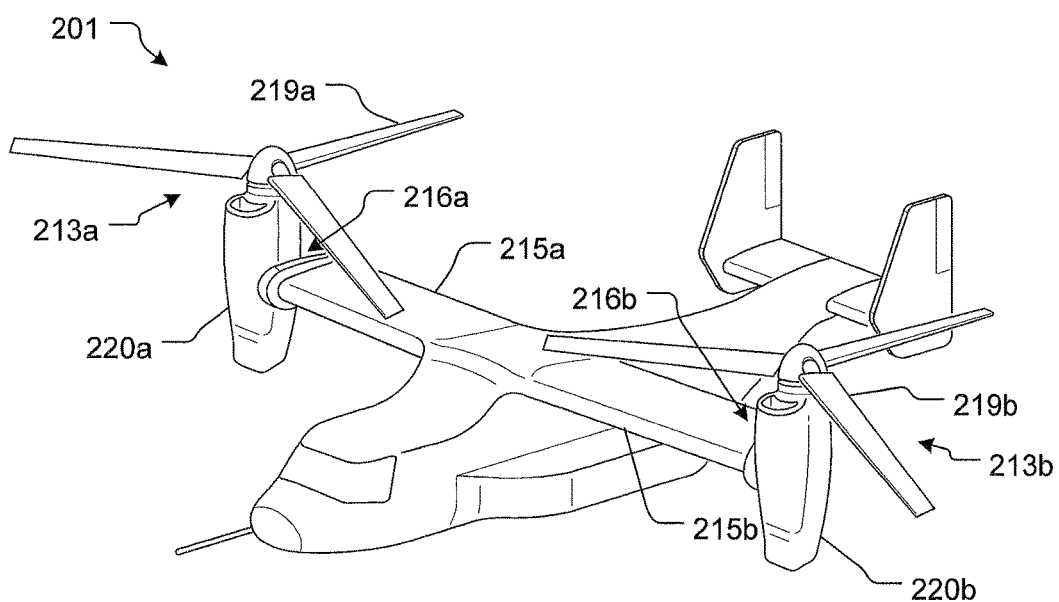
FIG. 3 is a perspective view of a tiltrotor aircraft according to an alternative embodiment of the present application.

Although shown associated with a helicopter, it will be appreciated that the system of the present application could also be utilized with different types of rotary aircraft and vehicles. For example, FIG. 3 illustrates a tiltrotor aircraft 201 that utilizes the system in accordance with the present application.

Tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

Figure 4:
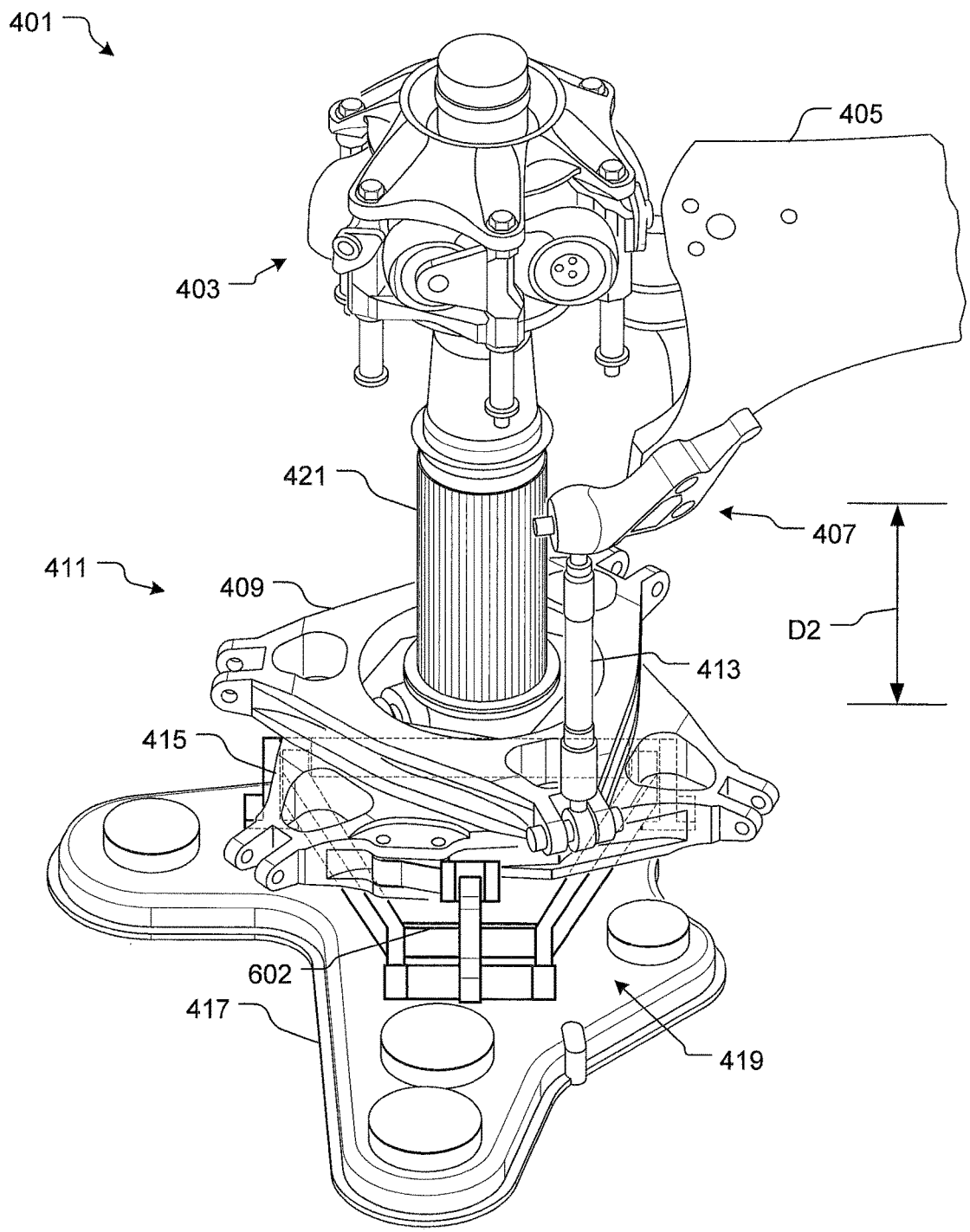
FIG. 4 is an oblique view of a rotor blade system in accordance with a preferred embodiment of the present application.

Referring now to FIG. 4 in the drawings, an oblique view of a rotor system 401 is shown in accordance with a preferred embodiment of the present application. It will be appreciated that the features of system 401 could be incorporated with aircrafts such as aircraft 101 and/or aircraft 201. In the contemplated embodiment, system 401 includes a rotor hub assembly 403 configured to pivotally attach to one or more blades 405. In the illustrative embodiment, many of the components of hub assembly 403 along with the additional blades are removed for clarity.

The root section 407 of blade 405 is configured to engage with a rotating ring 409 of swashplate 411 via a pitch link 413. During operation, the rotating ring 409 is configured to pivot blade 405 relative to the hub assembly 403 via pitch link 413. The swashplate 411 is further provided with a non-rotating ring 415 that is configured to engage with a top case 417 of a transmission via an anti-drive link system 419. During use, the swashplate 411 is raised and lowered along mast 421 via the anti-drive link system 419 in direction D2, commonly known as the collective stroke direction.

One of the unique features believed characteristic of the present application is the use of anti-drive link system 419. During use, the link system 419 is configured to raise and lower swashplate 411 in direction D2 during flight. These features are shown in at least FIGS. 5A and 5B. The link system 419 is preferably compact and engages with both the non-rotating ring 415 and top case 417 at optimal locations. Further, the link system 419 is configured to create an opening, which in turn receives mast 421 therethrough.

Figure 5A:
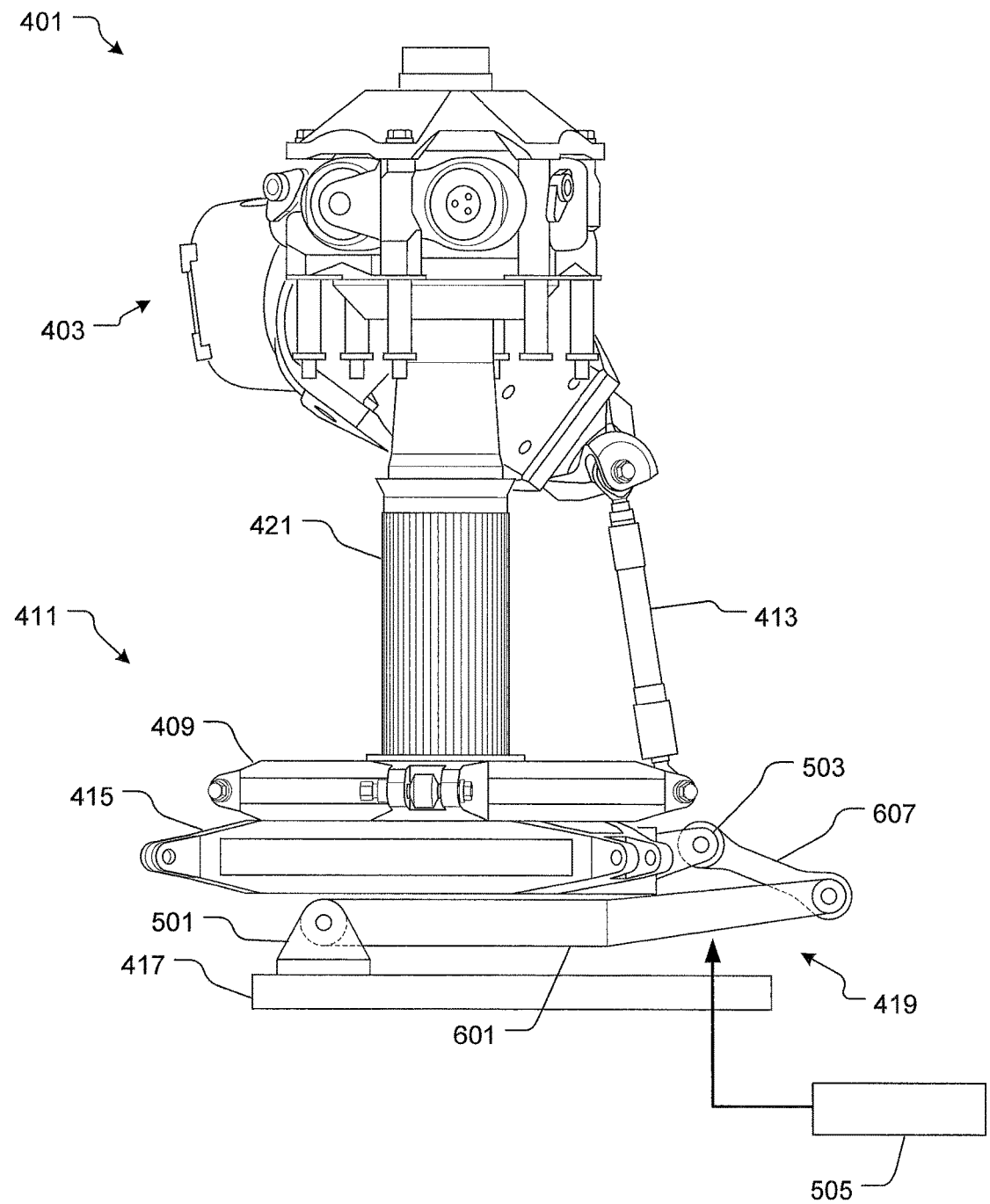
FIGS. 5A and 5B are side views of the rotor blade system of FIG. 4.
Figure 5B:
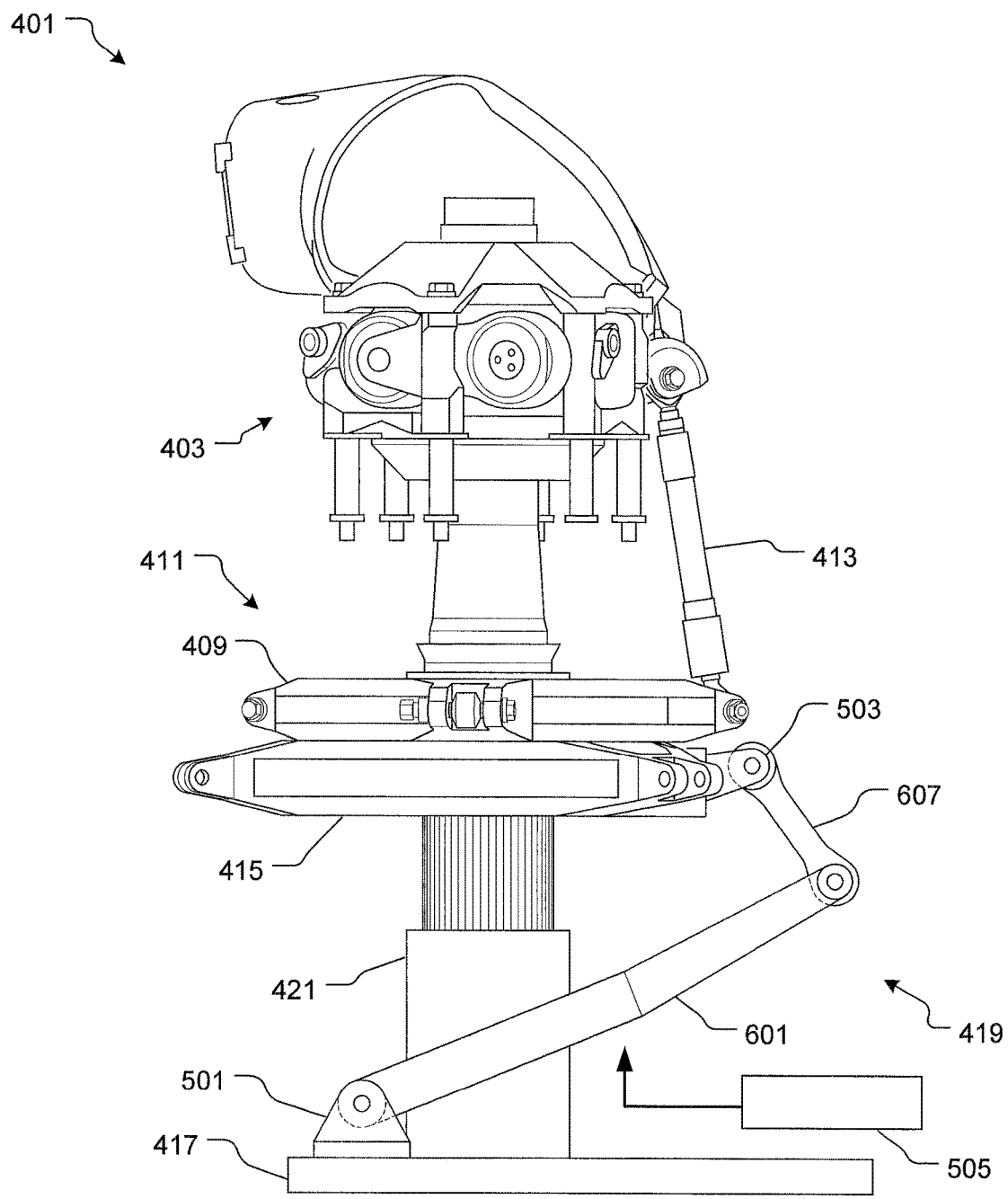

In FIGS. 5A and 5B, the anti-drive link system 419 is shown during operation. System 419 include one or more of two links 601, 603 (see, FIG. 6) pivotally attached to top casing 417 via a mounting joint 501 and pivotally attached to a third link 607, which in turn is pivotally attached to a drive joint 503 extending from non-rotating ring 415. In one contemplated embodiment, a cross link 602 is used for additional stabilization, thereby forming an "H-shaped" configuration. As depicted in the figures, a drive system 505 is configured to raise and lower the swashplate along the mast and relative to the top casing. In the contemplated embodiment, the drive system 505 is a hydraulic system configured to engage with and manipulate the raising and lowering of the swashplate along the mast.

Figure 6:
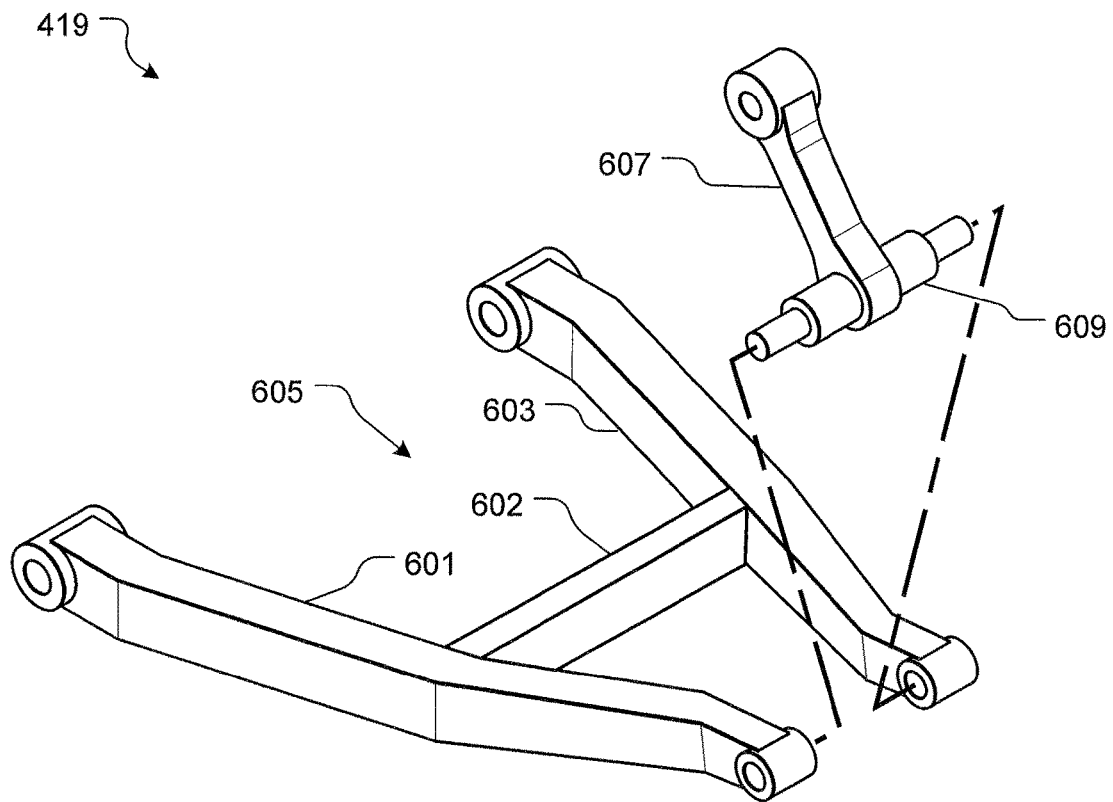
FIG. 6 is an oblique view of a link system of the rotor system FIG. 4.
Figure 7:
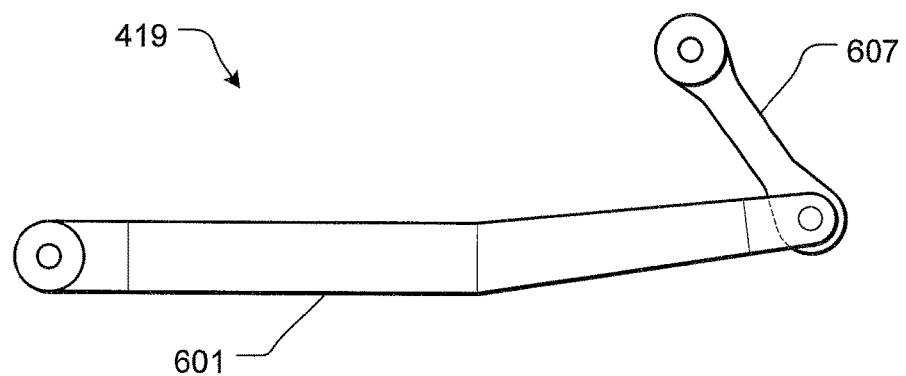
FIG. 7 is a side view of the link system of FIG. 6.

Referring now to FIGS. 6 and 7, respective disassembled oblique and side views of the anti-drive link system 419 is shown. In one contemplated embodiment, system 419 includes two links: a first link 601 and a second link 603, wherein both links extend relatively parallel to each other and form a gap 605 therebetween for receiving the mast 421 therethrough. Thus, the links 601, 603 form a V-shaped gap configured to receive the mast 421. The links 601, 603 pivotally attach to the mounting joint at one end and engage with a shaft 609 of the third link 607.

It will be appreciated that the anti-drive link system could also include a fourth link along with link 607 and pivotally attached links 601, 603, thus forming a H-shaped configuration.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotor blade system, comprising:
   a mast configured to drive a rotor blade;
   a swashplate engaged with the mast, the swashplate having:
      a non-rotating ring; and
      a rotating ring;
   an anti-drive link system comprising:
      a first and second link configured to extend relative to each other;
   wherein the anti-drive link system is pivotally engaged with a transmission top case and pivotally engaged with the non-rotating ring;
   wherein the anti-drive system pivotally engages with a single drive point extending from the non-rotating ring; and
   wherein the anti-drive link system is configured to raise and lower the swashplate along the mast.

2. The rotor blade system according to claim 1, further comprising:
   a hydraulic system configured for raising and lowering of the swashplate along the mast.

3. The rotor blade system according to claim 1, further comprising:
   a cross link attaching the first link to the second link.

4. The rotor blade system according to claim 3, further comprising:
   a third link pivotally engaged to the first and second link.

5. The rotor blade system according to claim 1, further comprising:
   a third link pivotally engaged to the first and second link.

6. The rotor blade system according to claim 5, further comprising:
   a shaft connecting the third link to the first and second link.

7. The rotor blade system according to claim 1, wherein the first link and the second link are configured to form an opening therebetween for the mast.

8. A rotor blade system, comprising:
   a mast configured to drive a rotor blade;
   a swashplate engaged with the mast, the swashplate having:
      a non-rotating ring; and
      a rotating ring;
   an anti-drive link system comprising:
      a first and second link; and
      a third link pivotally coupled to both the first and second link;
   wherein the anti-drive link system is pivotally engaged with a transmission top case and pivotally engaged with the non-rotating ring;
   wherein the anti-drive system pivotally engages with a single drive point extending from the non-rotating ring; and wherein the anti-drive link system is configured to raise and lower the swashplate along the mast.

9. The rotor blade system according to claim 8, wherein the first link and the second link are configured to form an opening therebetween for the mast.

10. The rotor blade system according to claim 8, further comprising:
a cross link rigidly attaching the first link to the second link.

* * * * *